(12) United States Patent
Herzberg

(10) Patent No.: US 6,459,678 B1
(45) Date of Patent: Oct. 1, 2002

(54) SYSTEM AND METHOD FOR PROVIDING NEAR OPTIMAL BIT LOADING IN A DISCRETE MULTI-TONE MODULATION SYSTEM

(75) Inventor: Hanan Herzberg, Morganville, NJ (US)

(73) Assignee: Globespan Semiconductor, Inc., Red Bank, NJ (US)

( * ) Notice: Subject to any disclaimer, the term of this patent is extended or adjusted under 35 U.S.C. 154(b) by 0 days.

(21) Appl. No.: 09/203,029

(22) Filed: Dec. 1, 1998

(Under 37 CFR 1.47)

Related U.S. Application Data

(60) Provisional application No. 60/067,472, filed on Dec. 5, 1997.

(51) Int. Cl.[7] .................................................. H04B 1/38
(52) U.S. Cl. ........................ 370/203; 370/252; 375/260
(58) Field of Search .................................. 370/203, 211, 370/210, 252, 484, 487; 375/232, 233, 234, 235, 346, 222, 227, 260

(56) References Cited

U.S. PATENT DOCUMENTS

| | | | |
|---|---|---|---|
| 5,495,483 A | 2/1996 | Grube et al. | 370/95.1 |
| 5,521,906 A | 5/1996 | Grube et al. | 370/17 |
| 5,539,777 A | 7/1996 | Grube et al. | 375/316 |
| 5,606,577 A | 2/1997 | Grube et al. | 375/295 |
| 5,608,725 A | 3/1997 | Grube et al. | 370/338 |
| 5,619,505 A | 4/1997 | Grube et al. | 370/476 |
| 5,682,419 A | 10/1997 | Grube et al. | 379/60 |
| 5,838,268 A | 11/1998 | Frenkel | 341/11 |
| 5,852,633 A | 12/1998 | Levin et al. | 375/260 |
| 6,005,589 A | * 12/1999 | Hyll | 375/260 |
| 6,009,122 A | * 12/1999 | Chow | 375/260 |
| 6,092,122 A | * 7/2000 | Liu et al. | 709/277 |
| 6,134,273 A | * 10/2000 | Wu et al. | 375/261 |
| 6,144,696 A | * 11/2000 | Shively et al. | 375/222 |
| 6,219,378 B1 | * 4/2001 | Wu | 375/231 |

OTHER PUBLICATIONS

Robert F.H. Fisher and Johannes B. Huber, A New Loading Algorithm for Discrete Miltitone Transmission, IEEE 1996, pp. 724 through 728.

* cited by examiner

*Primary Examiner*—Chau Nguyen
*Assistant Examiner*—Duc Duong
(74) *Attorney, Agent, or Firm*—Thomas, Kayden, Horstemeyer & Risley

(57) ABSTRACT

A communication system is disclosed in which information is transmitted using DMT modulation. The communication system includes first logic that is used to measure the response of each of the DMT subchannels and second logic that is used to adapt an equalizer filter associated with each of the DMT channels based on the response measurements. The system further includes third logic that measures the noise variance for each of the DMT subchannels. Using the noise variance measurements, fourth logic is used to assign the number of bits for transmission on each DMT subchannel such that total transmit power is minimized for a fixed data rate. Equations are provided for calculating a near optimal bit load allocation for the DMT subchannels and for calculating the total number of bits to be allocated to the DMT subchannels in a single encoding interval when total transmission power is limited.

20 Claims, 6 Drawing Sheets

(Prior Art) FIG. 3

SYSTEM AND METHOD FOR PROVIDING NEAR OPTIMAL BIT LOADING IN A DISCRETE MULTI-TONE MODULATION SYSTEM

CROSS REFERENCE TO RELATED APPLICATION

This application claims the benefit of U.S. Provisional Application No. 60/067,472 entitled "METHOD FOR PROVIDING LOW COMPLEXITY AND NEAR OPTIMAL BIT LOADING ALGORITHM FOR DMT," filed Dec. 5, 1997, which is incorporated herein by reference.

BACKGROUND OF THE INVENTION

The present invention relates generally to the field of modulation techniques for digital subscriber loop (DSL) technology, and, more particularly, to improving the performance of communication systems using discrete multi-tone (DMT) modulation.

DSL technology refers to a variety of technologies in which highly sophisticated modulation and crosstalk management techniques are used to greatly expand the bandwidth potential over a single pair of copper wires. The Integrated Services Digital Network (ISDN) is generally considered the original DSL application and provides data rates of 192 kbps in a basic rate interface (BRI) configuration and 1.544 Mbps in a primary rate interface (PRI) configuration. Since the introduction of ISDN in the early to mid-980s, DSL technology has evolved to provide faster data rates in various configurations. For example, high bit rate digital subscriber line (HDSL) uses the same modulation technique as ISDN, but on a larger bandwidth thereby allowing HDSL to provide full duplex T1 (1.544 Mbps) or E1 (2.048 Mbps) service across existing twisted pair copper lines without repeaters.

Other manifestations of DSL technology include the following: symmetric digital subscriber line (SDSL), which provides bi-directional communication at data rates ranging from 160 kbps–2.084 Mbps; asymmetric digital subscriber line (ADSL), which provides data rates between 32 kbps–8.192 Mbps downstream to the subscriber and 32 kbps–1.088 Mbps upstream to the network; and very high bit rate digital subscriber line (VDSL), which provides higher data rates the closer the subscriber is to the central office (CO). For example, 13 Mbps is possible within approximately 5000 feet of the CO, 26 Mbps is possible within approximately 3000 feet, and 51 Mbps is possible within approximately 1000 feet.

ADSL technology has been particularly well received by communication service providers, such as phone companies, because it corresponds to the asymmetric nature of most subscribers' data applications. For example, such services as video on demand, Internet access, home shopping, and multimedia access all generally require high data rates downstream to the subscriber, but relatively low data rates upstream to the network. Moreover, the growth of the Internet in combination with the increased growth of telecommuting have been driving forces in the widespread deployment of ADSL. One particular embodiment of ADSL that has been instrumental in the business success of the technology is rate adaptive digital subscriber line (RADSL). RADSL allows the service provider to adjust the data rate of the DSL communication link according to the need of the application and to account for line length and quality.

The key to the rate adaptation capability of RADSL is the DMT modulation technique. DMT has been selected by the American National Standards Institute (ANSI) as the standard modulation technique for ADSL because it has greater immunity to noise and can provide greater flexibility in data rates than competitive modulation techniques, such as quadrature amplitude modulation (QAM) and carrierless amplitude/phase modulation (CAP). Specifically, DMT uses the frequency spectrum between 26 kHz and 1.1 MHz for data transmission and the spectrum below 4 KHz for plain old telephone service (POTS). The spectrum up to 1.1 MHz is divided into 256 subcarriers or subchannels each with a 4 KHz bandwidth that can be independently modulated from zero to a maximum of 15 bits/Hz. A transmitter, such as a modem, can use these individual channels to dynamically adapt to line conditions to attain the maximum throughput for the communication link (i.e., DSL link). As the throughput of each individual subchannel is optimized, the overall throughput of the communication link is optimized.

To perform this throughput optimization, a modem will first analyze the line conditions (e.g., signal to noise ratio) for the subchannels during initialization. The number of bits to be transmitted per channel are then mapped according to the signal to noise ratios measured for the subchannels. Clearly, more bits will be allocated to those subchannels exhibiting high noise imunnunity while few or perhaps no bits will be allocated to very noisy channels. The modem will continually monitor the status of the individual subchannels throughout a communication session and will adjust the bit allocation per channel as necessary to maintain optimum throughput.

Thus, to fully realize the benefits of (R)ADSL as provided through DMT, bits must be allocated to the individual DMT subchannels in an efficient and optimal manner. That is, bits must be allocated to the various channels with as fine a granularity as possible to ensure that the maximum throughput capability of each subchannel is fully utilized. Accordingly, what is sought is a system and/or method for optimally allocating bits to the various subchannels in a DMT modulation system.

SUMMARY OF THE INVENTION

Certain advantages and novel features of the invention will be set forth in the description that follows and will become apparent to those skilled in the art upon examination of the following or may be learned with the practice of the invention.

To achieve the advantages and novel features, the present invention is generally directed to a communication system in which information is transmitted using DMT modulation. The communication system includes first logic that is used to measure the response of each of the DMT subchannels and second logic that is used to adapt an equalizer filter associated with each of the DMT channels based on the response measurements. The system further includes third logic that measures the noise variance for each of the DMT subchannels. Using the noise variance measurements, fourth logic is used to assign the number of bits for transmission on each DMT subchannel such that total transmit power is minimized for a fixed data rate.

In accordance with one aspect of the invention, the fourth logic uses the following equation for calculating the number of bits, $b_i$, to be allocated on the ith DMT subchannel:

$$b_i = \frac{b_T}{N} + \frac{1}{N}\sum_{j=1}^{N}\log_2\sigma_j^2 - \log_2\sigma_i^2,$$

where N is the total number of DMT subchannels, $b_T$ is the total number of bits to be transmitted, and $94_1$ is the noise variance for said ith DMT subchannel.

The invention can also be viewed as providing a method for allocating bits to individual subchannels in a DMT modulation system. Broadly stated, the method can be summarized by the following steps: (i) measure the channel response for each of the DMT subchannels; (ii) adapt an equalizer filter associated with each of the DMT subchannels based on the measurements obtained in step (i); (iii) measure the noise variance for each of the DMT subchannels; and (iv) using the noise variance measurements obtained in (iii), allocate the number of bits to be transmitted on each of the DMT subchannels such that total transmit power is minimized for a fixed data rate.

The DMT based communication system according to the present invention is advantageous in that bits are allocated to the individual DMT subchannels in a near optimal fashion based on noise measurements that can be obtained during an initialization or training interval. Thus, the invention can be readily incorporated into communication devices, such as modems, without requiring significant architectural or operational changes to the devices.

BRIEF DESCRIPTION OF THE SEVERAL VIEWS OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIENT

Figure 1:
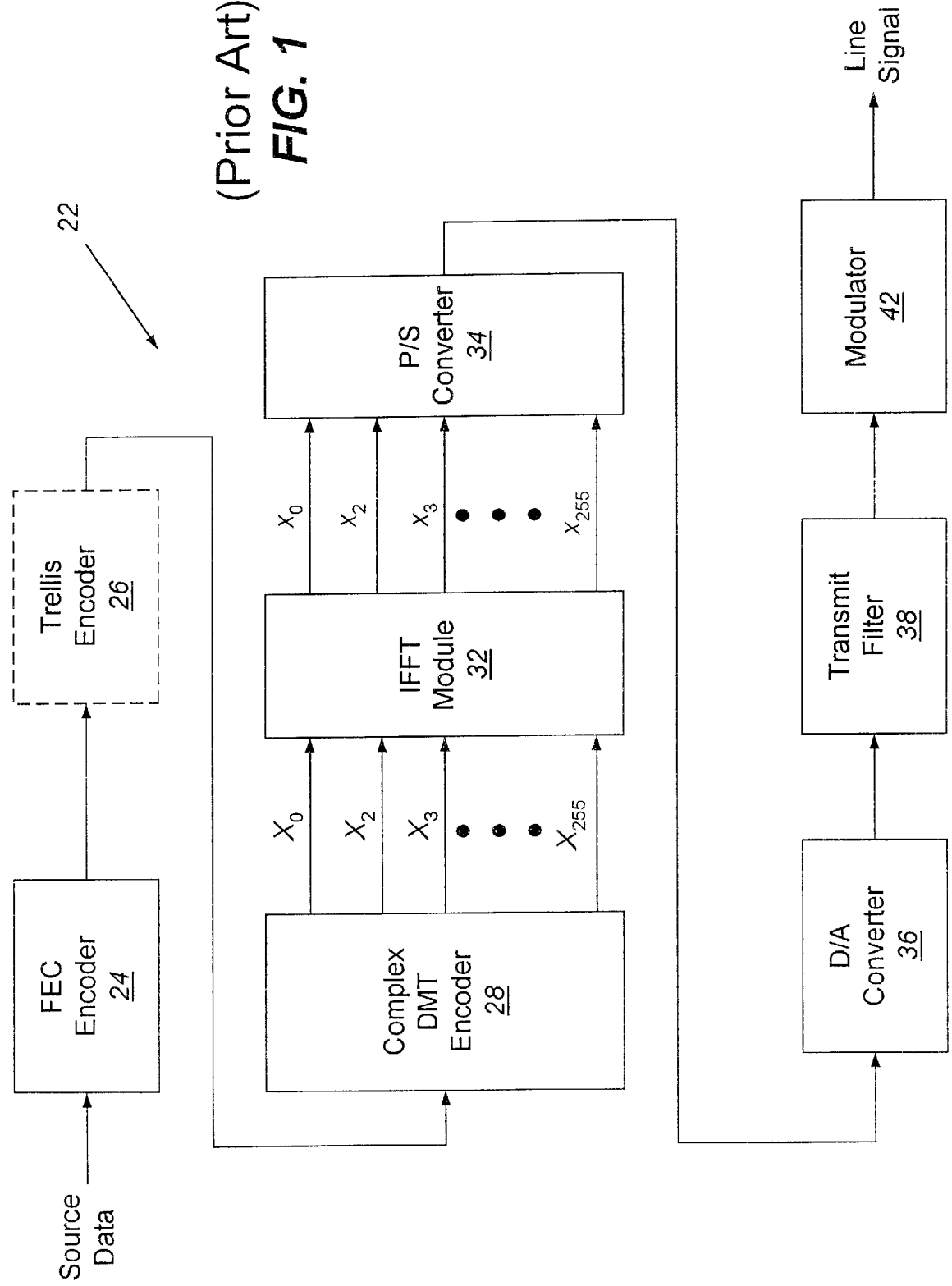
FIG. 1 is a block diagram of a prior art transmitting modem using DMT modulation.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

Figure 2:
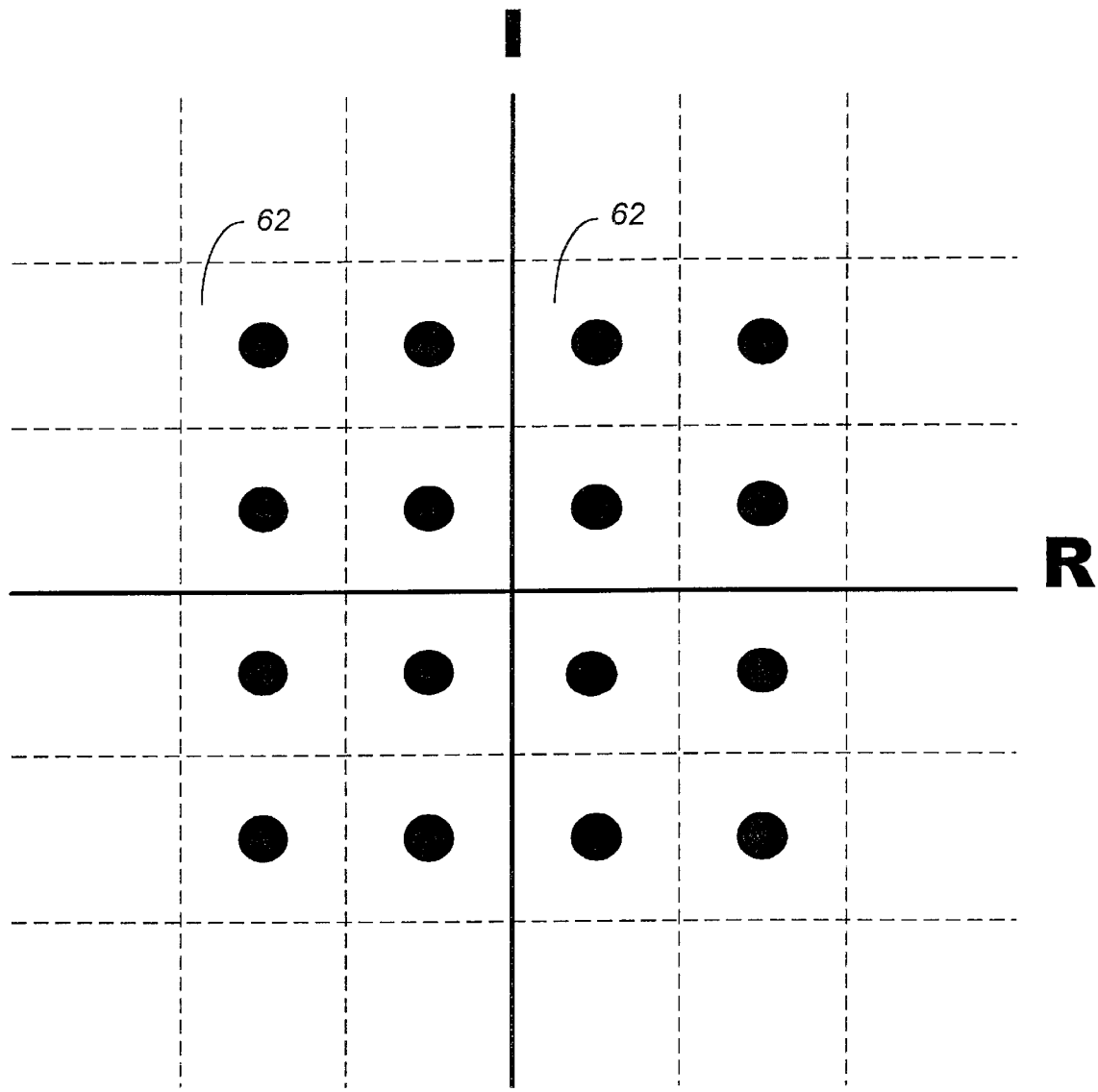
FIG. 2 is an exemplary constellation diagram of signal points that are transmitted on a DMT subchannel.
Figure 3:
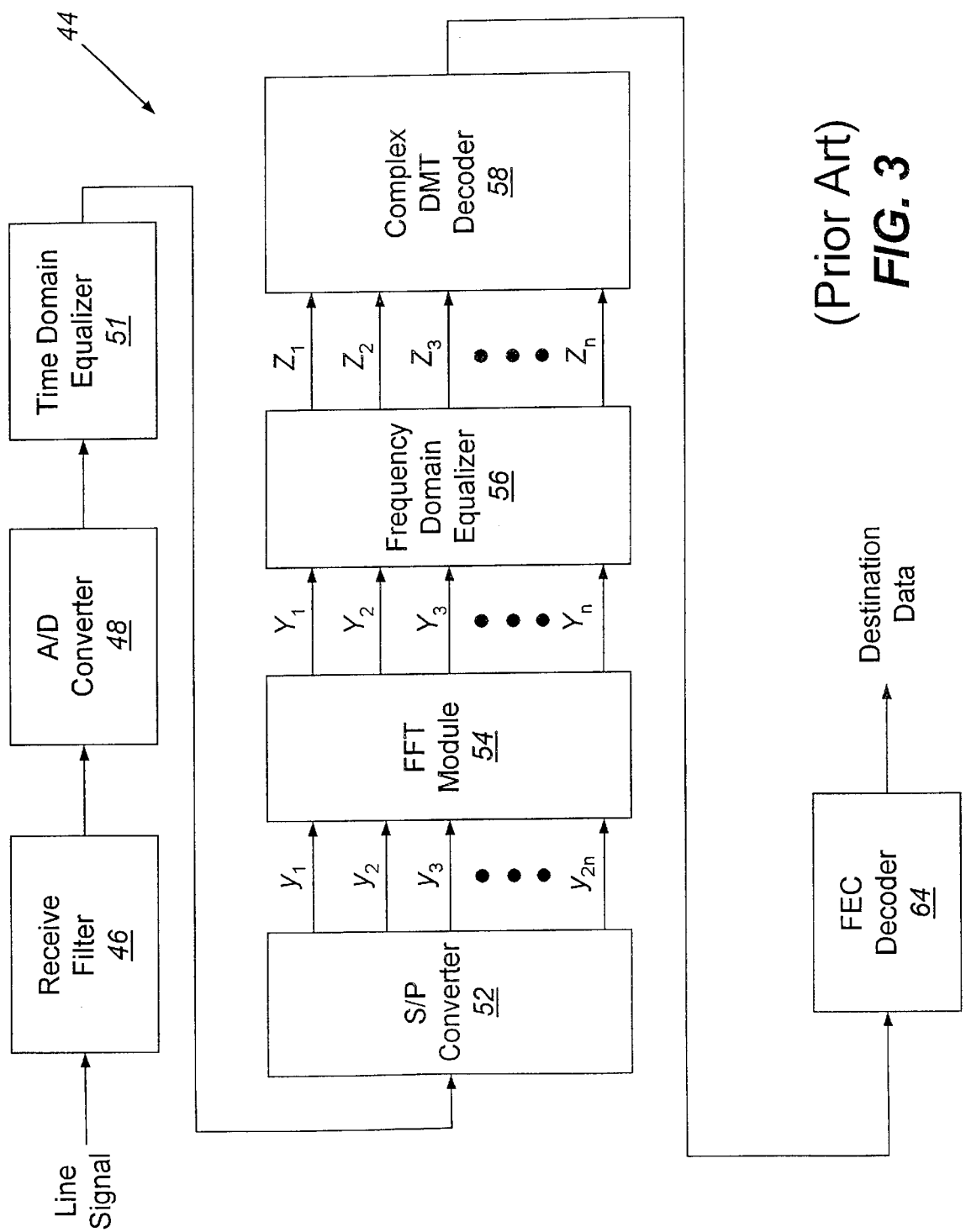
FIG. 3 is a block diagram of a prior art receiving modem using DMT demodulation.

With reference to FIGS. 1, 2 and 3, the basic architecture and operation of a transmitting modem and receiving modem using DMT modulation will be described hereafter.

FIG. 1 illustrates the components involved in implementing a DMT modulation scheme in a DMT transmitting modem 22. Source data to be transmitted are first encoded using a suitable coding scheme. To allow errors to be detected and corrected at the receiver, the source bits are encoded through the use of a forward error correcting (FEC) encoder 24 and optionally through the use of a trellis encoder 26. As a result of the coding process, additional bits will be added to the source bit stream that are used by the receiving modem to detect errors in the source data.

The encoded bit stream is then received by complex DMT encoder 28. DMT encoder 28 parses the incoming bit stream into groups of bits $b_i$, where $0 \leq i \leq 255$. That is, a specific number of bits will be allocated for transmission on each of the 256 subchannels used in the DMT modulation scheme. Thus, the domain for the symbols to be transmitted on each of the DMT subchannels can be represented as a two-dimensional constellation of complex values $X_i$ where the number of complex values n for the ith DMT subchannel is given by EQ. 1:

$$2 \leq n \leq 2^{b_i} \text{ if } b_i \geq 1 \qquad \text{EQ. 1}$$

n=0 if $b_i$=0

FIG. 2 illustrates an example constellation of values $X_i$ for a DMT subchannel i onto which four bits (i.e., $b_i$=4) have been allocated for transmission. The horizontal axis of FIG. 2 corresponds to the real part of $X_i$ while the vertical axis corresponds to the imaginary part of $X_i$. The output of DMT encoder 28 is therefore a collection of complex values $X_i$ corresponding to the DMT subchannels with each variable identifying a particular constellation point that represents the data symbol to be transmitted.

The complex variables $X_i$ generated by DMT encoder 28 are then received by inverse fast Fourier transform (IFFT) module 32 that converts the complex values $X_i$ in the frequency domain to real values $x_i$ in the time domain. Parallel-to-serial (P/S) converter 34 produces a serial sequence of real values $x_i$, which are then converted into a time variant, analog signal by digital-to-analog (D/A) converter 36. This analog data signal is then filtered by transmit filter 38 and used to modulate a carrier signal by modulator 42. Finally, modulator 42 generates a line signal that is transmitted onto the communication medium (e.g., twisted pair).

FIG. 3 is a high level block diagram of a DMT receiving modem 44. Receiving modem 44 essentially reverses the processing performed by transmitting modem 22. The incoming line signal is first filtered by receive filter 46 and then converted back into a sequence of digital samples by analog-to-digital (A/D) converter 48. A time domain equalizer 51 compensates for the effects of inter-symbol interference (ISI) due to delay caused by the communication medium. Note that time domain equalizer 51 represents a plurality of equalizer filters corresponding to the DMT subchannels. Serial-to-parallel (S/P) converter 52 converts this sequence of digital values into a parallel collection of values $y_i$ corresponding to the DMT subchannels. Real values $y_i$ in the time domain are then converted into complex values $Y_i$ in the frequency domain by FFT module 54. In theory, complex values $Y_i$ should correspond to the complex values $X_i$ determined by DMT encoder 28 in transmitting modem 22. Unfortunately, values $Y_i$ are shifted away from the ideal values defined in the constellation for that DMT subchannel because of the effects of noise and attenuation due to distortion caused by the communication medium. Thus, equalizer 56, which generally represents a plurality of equalizer filters for the DMT subchannels, is used to compensate for the transfer function of the communication medium to map complex values $Y_i$ into filtered values $Z_i$ that fall into the same decision boundaries used to distinguish between complex values $X_i$ for the same DMT subchannel.

Referring now to both FIG. 2 and FIG. 3, Complex DMT decoder 58 compares the complex value $Z_i$ received for each DMT subchannel with the decision regions 62 (see FIG. 2) defined in the constellation used for that subchannel to decode the symbol. After the symbols for the DMT subchannels have been decoded, they are then re-sequenced to match the ordering of the data stream at the transmitter prior to the allocation of bits into separate DMT subchannels. Finally, the resultant bit stream from the complex DMT decoder is processed by FEC decoder 64 to account for any transmission errors that may still remain. The destination bit stream that is output from FEC decoder 64 should ultimately match the source bits provided to the transmitting modem 22.

Figure 4:
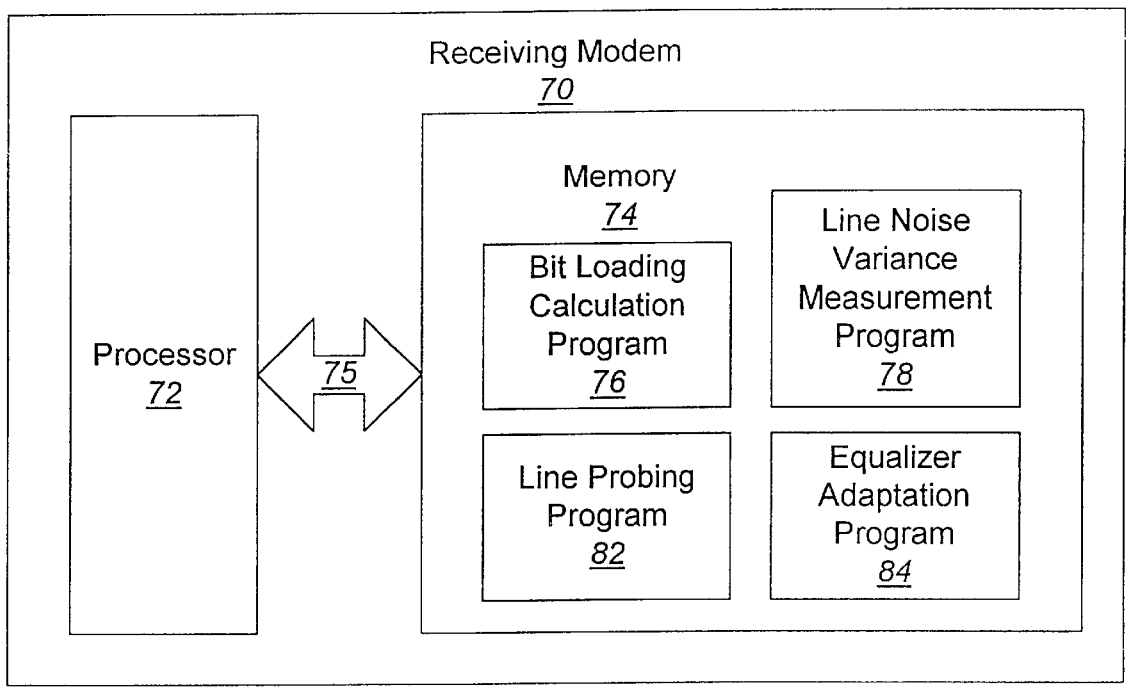
FIG. 4 is a high-level block diagram of a receiving modem in accordance with principles of the present invention.

It is generally understood in the art that the various components of DMT transmitting modem 22 and DMT receiving modem 44 can be implemented through hardware, through program code executed by a processor, or a combination thereof As discussed hereinbefore, maximum throughput in a DMT communication system is dependent upon an optimal allocation of source data bits to the individual DMT subchannels. The present invention addresses this need by providing a system and a method for optimizing DMT subchannel bit allocation. With reference to FIG. 4, a receiving modem 70 embodying the principles of the present invention is shown to comprise, in addition to the general DMT receiving modem components shown in FIG. 3, a processor 72 in communication with a storage medium 74 over a communication bus 75. Processor 72 can be any commercially available or custom microprocessor suitable for an embedded application. Storage medium 74 is representative of the overall hierarchy of memory devices containing the program code and data used to implement the functionality of receiving modem 70. Storage medium 74 can include, but is not limited to, the following types of devices: cache, ROM, PROM, EPROM, EEPROM, flash, SRAM, and DRAM. Note that it is not uncommon for receiving modem 70 to use multiple processors, such as digital signal processors (DSPs), in implementing the modem functionality. Storage medium 74 is shown to contain four main program code modules for optimizing DMT subchannel bit allocation: 1) a bit loading calculation program 76; 2) a line noise variance measurement program 78; 3) a training program 82; and 4) an equalizer adaptation program 84. The functionality of these four modules will be described hereafter with reference to the flow chart of FIG. 5.

Figure 5:
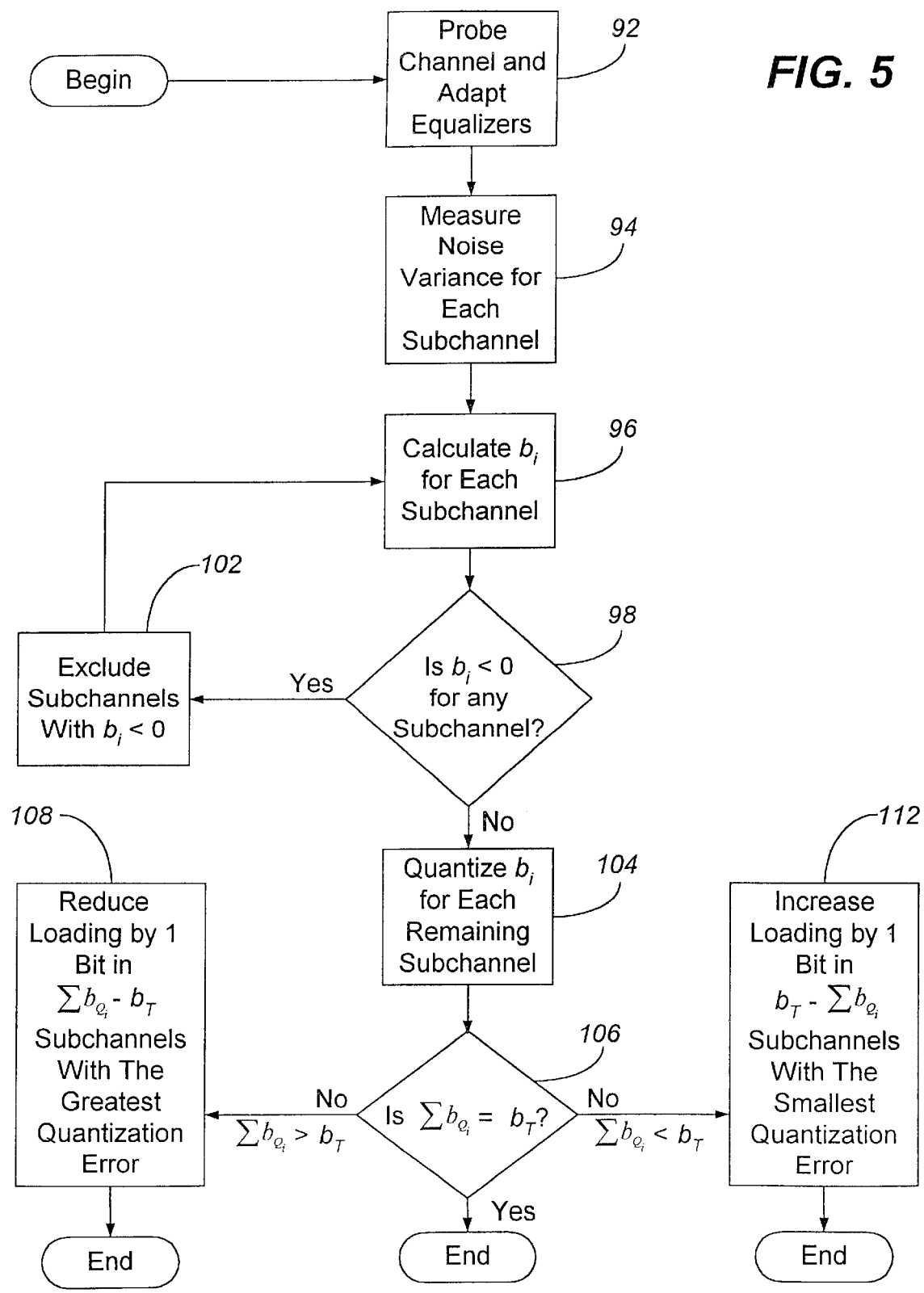
FIG. 5 is a flow chart depicting the steps involved in optimally allocating bits to DMT subchannels according to the present invention.

As set forth in FIG. 5, training program 82 measures the response of the communication medium for each of the DMT subchannels and cooperates with equalizer adaptation program 84 to adapt the equalizers 56 (see FIG. 3) in step 92. The DMT subchannel response can be measured by a training sequence. The equalizers should be adjusted accordingly, that is, each DMT subchannel can be treated as an additive white Gaussian noise (AWGN) channel.

Next, the variance of the noise for each DMT subchannel, denoted by $\sigma_i^2$; i=1, 2, ... N, where N is the number of subchannels, is measured under the control of line noise variance measurement program 78 as indicated by step 94. This measurement will be performed under the assumption that a perfect channel probing has been done in step 92, hence, the equalizers 56 are compensating for the response of each DMT subchannel both in the time domain and in the frequency domain.

The symbol error rate of the ith DMT subchannel can be written as follows:

$$Pr(e_i) = K_i Q\left(\frac{d_i}{\sigma_i \sqrt{2}}\right), \qquad \text{EQ. 2}$$

where $$Q(x) = \frac{1}{\sqrt{2\pi}} \int_x^\infty \exp(-y^2/2) dy$$

(i.e., the Gaussian distribution) and $d_i$ is the minimum Euclidean distance among the received constellation of signal points or symbols, and the coefficient $K_i$ is approximately equal to 4 for the constellation. Now, letting $$\gamma = \frac{d_i^2}{2\sigma_i^2},$$

it can be deduced that each DMT subchannel should have the same value of $\gamma$ achieve identical error rates. Assuming a desired probability of error of $10^{-7}$, $\gamma$ is determined as follows from EQ. 2:

$$\gamma = Q^{-1}(2.5 \times 10^{-8}) = 5.45, \qquad \text{EQ. 3}$$

where $Q^{-1}(x)$ is the inverse of the Q function.

The following steps used in determining an allocation of bits for the individual DMT subchannels assume a fixed data rate in which $b_T$ is the total number of bits in a block of data to be allocated to the DMT subchannels in a single DMT encoding interval. Thus, the process is designed to optimally allocate bits to the individual DMT subchannels for transmission while minimizing power consumption.

Typically, the constellation of symbols (see FIG. 2) for each DMT subchannel will be modulated onto the subchannel using quadrature amplitude modulation (QAM). Assuming each DMT subchannel is using a QAM constellation, the transmit power $S_i$ of each subchannel can be approximated by EQ. 4 below:

$$S_i \sim d_i^2 \tfrac{1}{6} 2^{b_i}, \qquad \text{EQ. 4}$$

where $b_i$ is the number of bits allocated to the ith subchannel. Substituting the definition of $\gamma$ into EQ. 4 yields EQ. 5:

$$S_i = \gamma \tfrac{1}{3} \sigma_i^2 2^{b_i} \qquad \text{EQ. 5}$$

The total transmit power is therefore given by EQ. 6:

$$S_T = \sum_{i=1}^N S_i = \frac{\gamma}{3} \sum_{i=1}^N \sigma_i^2 2^{b_i}, \qquad \text{EQ. 6}$$

Recall that $$b_T = \sum_{i=1}^N b_i,$$

which means, in other words, that the size of the block of data to be allocated in a single encoding interval is equal to the sum of the number of bits to be allocated to each of the DMT subchannels. It can be shown that transmission power is minimized when $\sigma_i^2 2^{b_i}$ is a constant, which is denoted by C. Therefore, EQ. 7 can be derived from EQ. 6 as follows:

$$(\sigma_i^2 2^{b_i})^N = C^N = \prod_{j=1}^{N} \sigma_j^2 2^{b_j} = 2^{\sum_{j=1}^{N} b_j} \prod_{j=1}^{N} \sigma_j^2 = 2^{b_T} \prod_{j=1}^{N} \sigma_j^2 \qquad \text{EQ. 7}$$

Taking the logarithm of EQ. 7 yields the optimal bit allocation shown below as EQ. 8:

$$b_i = \frac{b_T}{N} + \frac{1}{N} \sum_{j=1}^{N} \log \sigma_j^2 - \log \sigma_i^2, \qquad \text{EQ. 8}$$

where log(x) stands for the logarithm base two.

Returning to the flow chart of FIG. 5, in step 96 bit loading calculation program 76 uses noise variance measurements received from line noise variance measurement program 78 to calculate the optimal bit allocation for each DMT subchannel according to the formula set forth in EQ. 8. Once the initial bit allocations are made for each DMT subchannel, bit loading calculation program 76 will determine at decision diamond 98 whether $b_i$ is less than zero for any subchannel. Any subchannel in which $b_i$ is less than zero is excluded in step 102. Bit loading calculation program 76 will then calculate new values for $b_i$ using EQ. 8 in which the number of channels, N, is reduced to N' as a result of excluding subchannels with a calculated $b_i$ that is less than zero. Steps 96 and 102 repeat in an iterative fashion until all remaining subchannels have positive values for $b_i$.

Because the values calculated for $b_i$ will not necessarily be integers, a quantization is performed on any non-integer bit allocations in step 104 using EQ. 9 set forth below.

$$b_{Q_i} = \begin{cases} b_{\max}, & b_i \geq b_{\max} - 0.5 \\ INT(b_i + 0.5), & b_{\min} - 0.5 \leq b_i < b_{\max} - 0.5 \\ 0, & b_i < b_{\min} - 0.5 \end{cases} \qquad \text{EQ. 9}$$

where INT(x) is the integer value of x, $b_{max}$ is the maximum number bits permitted per subchannel, and $b_{min}$ is the minimum number of bits per symbol.

The quantization performed in step 104 may result in quantized DMT subchannel bit allocations that, when summed, exceed the total size of the data block to be encoded, $b_T$. At decision diamond 106, bit loading calculation program compares the summed total of the quantized bit allocations with the total number of bits, $b_T$, in the data block to be encoded. Letting $$b_{QT} = \sum_{i=1}^{N'} b_{Q_i},$$

If the sum of the quantized bit allocations equals the total number of bits in the data block to be encoded (i.e., $b_{QT}=b_T$), the process completes and the DMT subchannels are assigned the quantized bit allocations from EQ. 9. Otherwise, the quantized bit allocations must be modified so that their sum equals the total number of bits to be encoded, $b_T$.

In modifying the quantized bit allocations, it is helpful to first denote the quantization error for a particular DMT subchannel bit allocation by $\Delta b_i = b_i - b_{Q_i}$. If $b_{QT} > b_T$, the total number of quantized bits allocated to the DMT subchannels is reduced by $b_{QT} - b_T$. As indicated in step 108, bit loading calculation program 76 decrements $b_{Q_i}$ by one bit for the $b_{QT} - b_T$ subchannels with the largest quantization error, $\Delta b_i$. If $b_{QT} < b_T$, the total number of quantized bits allocated to the DMT subchannels is increased by $b_T - b_{QT}$. As indicated in step 112, bit loading calculation program 76 increments $b_{Q_i}$ by one bit for $b_T - b_{QT}$ subchannels with the smallest quantization error, $\Delta b_i$. The final values calculated for $b_{Q_i}$ are ultimately communicated to the transmitting modem, which will use the values in implementing the DMT modulation scheme.

As stated hereinbefore, the foregoing bit allocation process is designed to optimally allocate bits to the individual DMT subchannels for transmission while minimizing power consumption. Nevertheless, the process can be modified for application in those circumstances where the total power, $S_T$, is limited. In that case, the bit allocation process is designed to maximize the overall data rate for a given power level. Based on EQ. 5 and the optimization rule that transmission power is minimized when $\sigma_i^2 2^{b_i}$ is a constant, C, it can be shown that if bits are allocated to the DMT subchannels according to EQ. 8, then the same power should be used for each subchannel. That is, the transmission power level, $S_i$, for a DMT subchannel is given by EQ. 10 set forth below:

$$S_i = S_T/N' \qquad \text{EQ. 10}$$

EQ. 11 follows from EQ. 5, EQ. 7, and EQ. 10.

$$2^{\frac{b_T}{N'}} = \frac{3 S_T / N'}{\gamma^{N'} \sqrt{\prod_{i=1}^{N'} \sigma_i^2}} \qquad \text{EQ. 11}$$

Accordingly, EQ. 11 can be rewritten as EQ. 12, which provides an expression for calculating the total data block size, $b_T$, to be to be allocated in a single encoding interval as a function of the total power $S_T$, the number of DMT channels to be loaded N', and the noise variance on the individual DMT channels.

$$b_T = N' \log \frac{3 S_T}{\gamma N'} - \sum_{i=1}^{N'} \log \sigma_i^2 \qquad \text{EQ. 12}$$

Figure 6:
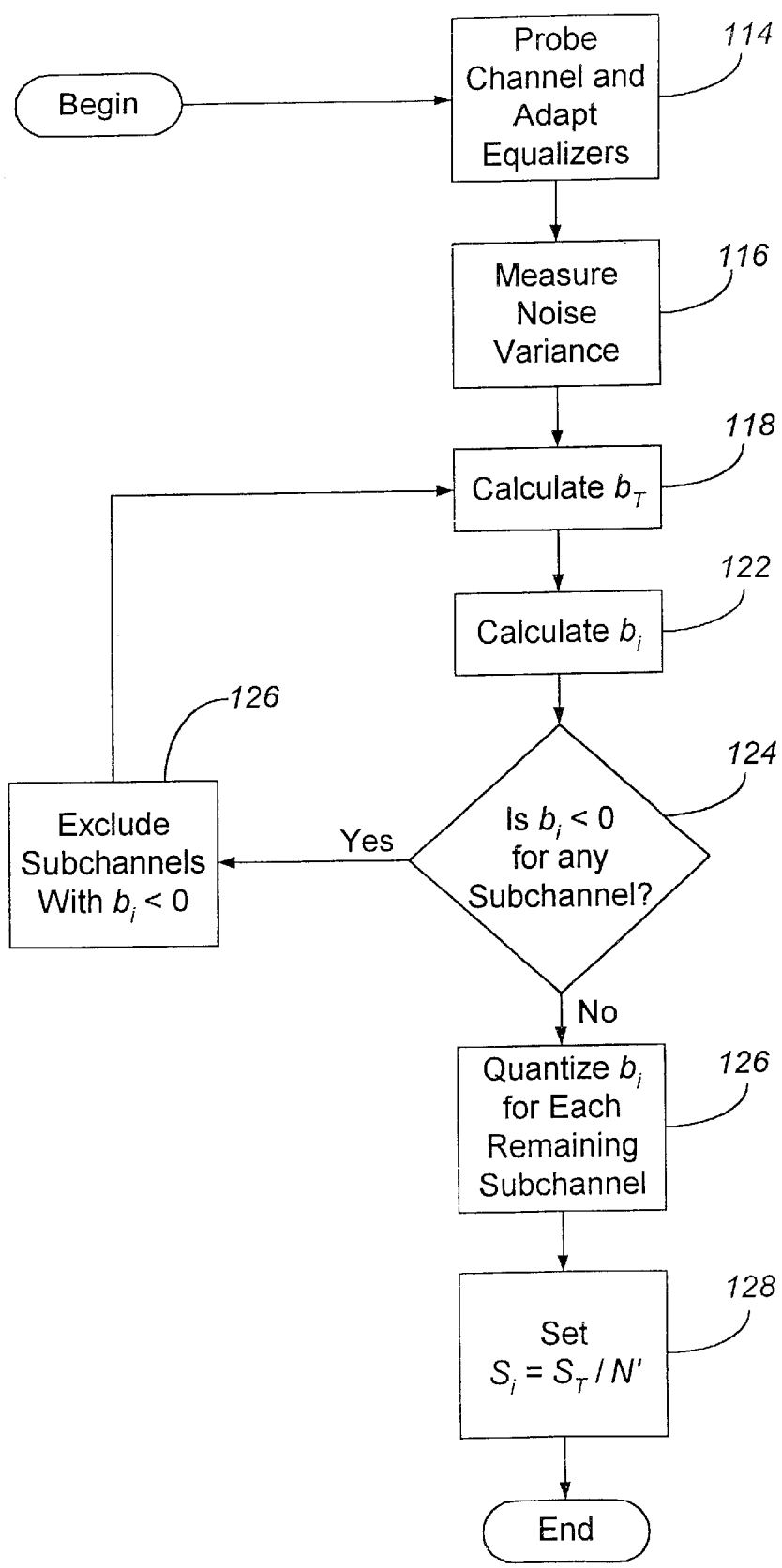
FIG. 6 is a flow chart depicting the steps involved in calculating the total number of bits to be allocated to the DMT subchannels in a single encoding interval when total transmission power is restricted.

Referring now to FIG. 6, the DMT bit allocation process according to the present invention will be described hereafter with the limitation that total transmission power $S_T$ is limited. The process begins with steps 114 and 116, which are the same as steps 92 and 94 from FIG. 5. In step 114, training program 82 measures the response of the communication medium for each of the DMT subchannels and cooperates with equalizer adaptation program 84 to adapt the equalizers 56 (see FIG. 3). Next, the variance of the noise for each DMT subchannel is measured under the control of line noise variance measurement program 78 in step 116.

Once the noise variance measurements have been collected, bit loading calculation program 76 calculates the total data block size, $b_T$, to be encoded in step 118 using the expression set forth in EQ. 12. After calculating $b_T$, bit loading calculation program determines the optimal bit allocation for each DMT subchannel in step 122 according to the formula set forth in EQ. 8. Next, bit loading calculation program 76 will determine at decision diamond 98 whether $b_i$ is less than zero for any subchannel. Any subchannel in which $b_i$ is less than zero is excluded in step 126. Bit loading calculation program 76 will then calculate new values for $b_T$ and $b_i$ using EQ. 12 and EQ. 8 respectively in which the number of channels, N, is reduced to N' as a result of excluding subchannels with a calculated $b_i$ that is less than zero. Steps 118, 122, and 124 repeat in an iterative fashion until all remaining subchannels have positive values for $b_i$. Note that in the first iteration, N=N' for purposes of calculating $b_T$ using EQ. 12.

Because the values calculated for $b_i$ will not necessarily be integers, a quantization is performed on any non-integer bit allocations in step 126 using EQ. 9. Finally, the power levels for each of the individual DMT subchannels are set using EQ. 10 by dividing the total power, $S_T$, by the number of non-excluded, DMT subchannels, N'. The final values calculated for $S_i$ and $b_{Q_i}$ are ultimately communicated to the transmitting modem, which will use the values in implementing the DMT modulation scheme.

The present invention has been described as embodied in a receiving modem. The teachings disclosed herein, however, can be applied to alternative embodiments without departing from the principles of the present invention. For example, in one alternative embodiment, only the line probing, equalizer adaptation, and noise variance measurement steps (i.e., steps 92 and 94 in FIG. 5 and steps 114 and 116 in FIG. 6) are performed at the receiving modem. The noise variance measurements are then communicated to the transmitting modem where the bit loading calculation program resides for calculating the bit allocation for the DMT subchannels as described in the foregoing.

It will be appreciated by those skilled in the art that the functionality provided through bit loading calculation program 76, line noise variance measurement program 78, training program 82, and equalizer adaptation program 84 can also be implemented through hardware. Each implementation has its advantages. For example, hardware enjoys a speed and, arguably, a reliability advantage over software because hardware testing and verification methods are currently more advanced than software verification methods. On the other hand, software can be less expensive than customized hardware and offers greater flexibility in adding or modifying product features.

The bit loading calculation program 76, line noise variance measurement program 78, training program 82, and equalizer adaptation program 84, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

I claim:

1. A communication system using discrete multi-tone (DMT) modulation, comprising:
   a processor;
   a storage medium in communication with said processor;
   said storage medium having program code for allocating bits to be transmitted on a plurality of DMT subchannels, said program code comprising:
      first logic configured to measure a response for each said DMT subchannel;
      second logic configured to adapt an equalizer filter based on said response measured for each said DMT subchannel;
      third logic configured to measure a noise variance for each said DMT subchannel; and
      fourth logic configured to allocate bits for transmission on each said DMT subchannel based on the noise variance measured for each said subchannel such that total transmit power is minimized for a fixed data rate.

2. The system of claim 1, wherein said fourth logic uses an expression $$b_i = \frac{b_T}{N} + \frac{1}{N}\sum_{j=1}^{N} \log_2 \sigma_j^2 - \log_2 \sigma_i^2,$$

in calculating the number of bits, $b_i$, to be allocated on an ith DMT subchannel, wherein N is a total number of DMT subchannels, $b_T$ is a total number of bits to be allocated, and $\sigma_i$ is said noise variance for said ith DMT subchannel.

3. The system of claim 2, wherein said program code further comprises:
   fifth logic configured to exclude from said total number of DMT subchannels each said DMT subchannel having a calculated $b_i$ that is negative.

4. The system of claim 1, wherein said program code further comprises:
   fifth logic configured to quantize a number of bits, $b_i$, to be allocated on the ith DMT subchannel.

5. The system of claim 4, wherein said fifth logic uses an expression $$b_{Q_i} = \begin{cases} b_{\max}, & b_i \geq b_{\max} - 0.5 \\ INT(b_i + 0.5), & b_{\min} - 0.5 \leq b_i < b_{\max} - 0.5 \\ 0, & b_i < b_{\min} - 0.5 \end{cases}$$

in quantizing $b_i$, wherein $b_{Q_i}$ is a quantized value for $b_i$, $INT(x)$ is an integer value of x, $b_{max}$ is a maximum number of bits permitted per subchannel, and $b_{min}$ is a minimum number of bits per symbol.

6. A communication system using discrete multi-tone (DMT) modulation, comprising:

a processor;

a storage medium in communication with said processor said storage medium having program code for allocating bits to be transmitted on a plurality of DMT subchannels, said program code comprising:

first logic configured to measure a response for each said DMT subchannel;

second logic configured to adapt an equalizer filter based on said response measured for each said DMT subchannel;

third logic configured to measure a noise variance for each said DMT subchannel;

fourth logic configured to determine a total number of bits to be allocated, $b_T$, on said DMT subchannels based on a desired probability of error for each said subchannel such that a data rate is maximized for a fixed transmit power level; and fifth logic configured to allocate bits for transmission on each said DMT subchannel based on the noise variance measured for each said subchannel.

7. The system of claim 6, wherein said fourth logic uses an expression $$b_T = N\log\frac{3S_T}{\gamma N} - \sum_{i=1}^{N} \log \sigma_i^2$$

in calculating $b_T$, wherein $$\gamma = \frac{d_i^2}{2\sigma_i^2},$$

$d_i$ is a minimum Euclidean distance among a constellation of symbols transmitted on the ith DMT subchannel, N is a total number of DMT subchannels, and $\sigma_i$ is said noise variance for said ith DMT subchannel.

8. The system of claim 7, wherein said fifth logic uses an expression $$b_i = \frac{b_T}{N} + \frac{1}{N}\sum_{j=1}^{N} \log_2 \sigma_j^2 - \log_2 \sigma_i^2,$$

in calculating the number of bits, $b_i$, to be allocated on an ith DMT subchannel.

9. A method for allocating bits to individual subchannels in a discrete multi-tone (DMT) modulation system, said method comprising the steps of:

(a) measuring a response for each of the DMT subchannels;

(b) adapting an equalizer filter based on said response measured for each said DMT subchannel;

(c) measuring a noise variance for each of the DMT subchannels, and (d) allocating bits to be transmitted on each of the DMT subchannels based on the noise variance measured for each said subchannel such that total transmit power is minimized for a fixed data rate.

10. The method of claim 9, wherein step (d) comprises the step of:

calculating a number of bits, $b_i$, to be allocated on the ith DMT subchannel from a total number of bits to be allocated, $b_T$, using an expression $$b_i = \frac{b_T}{N} + \frac{1}{N}\sum_{j=1}^{N} \log_2 \sigma_j^2 - \log_2 \sigma_i^2,$$

wherein N is a total number of DMT subchannels and $\sigma_i$ is said noise variance for said ith DMT subchannel.

11. The method of claim 10, further comprising the steps of:

(e) excluding the DMT subchannels having a calculated $b_i$ that is negative from the total number of DMT subchannels, N, to determine a new total number of DMT subchannels, N'; and (f) repeating step (d) wherein N' is substituted for N.

12. The method of claim 9, further comprising the step of:

(e) quantizing a number of bits, $b_i$, to be allocated on the ith DMT subchannel.

13. The method of claim 12, wherein step (e) comprises the step of:

calculating a quantized value $b_{Q_i}$ for $b_i$, said value $b_{Qi}$ being calculated using an expression $$b_{Q_i} = \begin{cases} b_{max}, & b_i \geq b_{max} - 0.5 \\ INT(b_i + 0.5), & b_{min} - 0.5 \leq b_i < b_{max} - 0.5 \\ 0, & b_i < b_{min} - 0.5 \end{cases}$$

wherein INT(x) is an integer value of x, $b_{max}$ is a maximum number bits permitted per subchannel, and $b_{min}$ is a minimum number of bits per symbol.

14. A method for allocating bits to individual subchannels in a discrete multi-tone (DMT) modulation system, said method comprising the steps of:

(a) measuring a response for each of the DMT subchannels;

(b) adapting an equalizer filter based on said response measured for each said DMT subchannel;

(c) measuring a noise variance for each of the DMT subchannels;

(d) determining a total number of bits to be allocated, $b_T$, on said DMT subchannels based on a desired probability of error for each said subchannel such that a data rate is maximized for a fixed transmit power level; and (e) allocating bits for transmission on each said DMT subchannel based on the noise variance measured for each said subchannel.

15. The method of claim 14, wherein step (d) comprises the step of:

calculating the total number of bits to be allocated, $b_T$, using an expression $$b_T = N\log_2\frac{3S_T}{\gamma N} - \sum_{i=1}^{N} \log_2 \sigma_i^2,$$

wherein $$\gamma = \frac{d_i^2}{2\sigma_i^2}$$

and $d_i$ is a minimum Euclidean distance among a constellation of symbols transmitted on the ith DMT subchannel, N is a total number of DMT subchannels, and $\sigma_i$ is said noise variance for said ith DMT subchannel.

16. The method of claim 15, wherein step (e) comprises the step of:

calculating a number of bits, $b_i$, to be allocated on the ith DMT subchannel from a total number of bits to be allocated, $b_T$, using an expression $$b_i = \frac{b_T}{N} + \frac{1}{N}\sum_{j=1}^{N}\log_2\sigma_j^2 - \log_2\sigma_i^2,$$

wherein N is a total number of DMT subchannels and $\sigma_i$ is said noise variance for said ith DMT subchannel.

17. A computer readable medium having a program for allocating bits among a plurality of subchannels in a discrete multi-tone (DMT) modulation system, said program comprising:

logic configured to measure a response for each of the DMT subchannels;

logic configured to adapt an equalizer filter based on said response measured for each said DMT subchannel;

logic configured to measure a noise variance for each of the DMT subchannels; and logic configured to allocate bits to be transmitted on each of the DMT subchannels based on the noise variance measured for each said subchannel such that total transmit power is minimized for a fixed data rate.

18. The medium of claim 17, wherein said logic configured to allocate comprises:

logic configured to calculate a number of bits, $b_i$, to be allocated on the ith DMT subchannel from a total number of bits to be allocated, $b_T$, using an expression $$b_i = \frac{b_T}{N} + \frac{1}{N}\sum_{j=1}^{N}\log_2\sigma_j^2 - \log_2\sigma_i^2,$$

wherein N is a total number of DMT subchannels and $\sigma_i$ is said noise variance for said ith DMT subchannel.

19. A computer readable medium having a program for allocating bits among a plurality of subchannels in a discrete multi-tone (DMT) modulation system, said program comprising:

logic configured to measure a response for each of the DMT subchannels;

logic configured to adapt an equalizer filter based on said response measured for each said DMT subchannel;

logic configured to measure a noise variance for each of the DMT subchannels, logic configured to determine a total number of bits to be allocated, $b_T$, on said DMT subchannels based on a desired probability of error for each said subchannel such that a data rate is maximized for a fixed transmit power level; and logic configured to allocate bits for transmission on each said DMT subchannel based on the noise variance measured for each said subchannel.

20. The medium of claim 19, wherein said logic configured to determine comprises:

logic configured to calculate the total number of bits to be allocated, $b_T$, using an expression $$b_T = N\log_2\frac{3S_T}{\gamma N} - \sum_{i=1}^{N}\log_2\sigma_i^2,$$

wherein $$\gamma = \frac{d_i^2}{2\sigma_i^2}$$

and $d_i$ is a minimum Euclidean distance among a constellation of symbols transmitted on the ith DMT subchannel, N is a total number of DMT subchannels, and $\sigma_i$ is said noise variance for said ith DMT subchannel.

* * * * *